US011210613B2

(12) United States Patent
Sama et al.

(10) Patent No.: US 11,210,613 B2
(45) Date of Patent: Dec. 28, 2021

(54) METHOD AND SYSTEM FOR SEMI-SUPERVISED SEMANTIC TASK MANAGEMENT FROM SEMI-STRUCTURED HETEROGENEOUS DATA STREAMS

(71) Applicant: Dialpad UK Limited, London (GB)

(72) Inventors: Michele Sama, London (GB); Arseni Anisimovich, London (GB); Tim Porter, London (GB); Theodosia Togia, Cambridge (GB); James Hammerton, London (GB)

(73) Assignee: DIALPAD UK LIMITED, London (GB)

( * ) Notice: Subject to any disclaimer, the term of this patent is extended or adjusted under 35 U.S.C. 154(b) by 858 days.

(21) Appl. No.: 15/686,946

(22) Filed: Aug. 25, 2017

(65) Prior Publication Data

US 2018/0060793 A1    Mar. 1, 2018

Related U.S. Application Data

(60) Provisional application No. 62/379,521, filed on Aug. 25, 2016.

(51) Int. Cl.
| | | |
|---|---|---|
| *G06Q 10/06* | (2012.01) | |
| *G06N 20/00* | (2019.01) | |
| *G06N 3/04* | (2006.01) | |

(52) U.S. Cl.
CPC ... *G06Q 10/063114* (2013.01); *G06N 3/0427* (2013.01); *G06N 3/0445* (2013.01); *G06N 20/00* (2019.01)

(58) Field of Classification Search
CPC .......... G06Q 10/063114; G06N 20/00
See application file for complete search history.

(56) References Cited

U.S. PATENT DOCUMENTS

| | | | |
|---|---|---|---|
| 7,496,500 B2 * | 2/2009 | Reed ................... | G06Q 10/107 704/270 |
| 8,108,206 B2 * | 1/2012 | Hufnagel ............... | G06F 40/56 704/9 |

(Continued)

OTHER PUBLICATIONS

Kalia, Anup, et al. "Identifying business tasks and commitments from email and chat conversations." Technical Report HPL-2013-4, HP Laboratories (2013). (Year: 2013).*

(Continued)

*Primary Examiner* — Benjamin P Geib
(74) *Attorney, Agent, or Firm* — Patent Law Works LLP

(57) ABSTRACT

Embodiments of the present invention are directed to a computer-implemented machine-learning method and system for automatically creating and updating tasks by reading signals from external data sources and understanding what users are doing. Embodiments of the present invention are directed to a computer-implemented machine-learning method and system for automatically completing tasks by reading signals from external sources and understanding when an existing task has been executed. Tasks created are representable and explainable in a human readable format that can be shown to users and used to automatically fill productivity applications including but not limited to task managers, to-do lists, project management, time trackers, and daily planners. Tasks created are representable in a way that can be interpreted by a machine such as a computer system or an artificial intelligence so that external systems can be delegated or connected to the system.

20 Claims, 6 Drawing Sheets

| Alice's trigger events timeline | Activity | Notes |
|---|---|---|
| Email to Fred "Can you send me the lease draft by Tomorrow?" | Create 000001 | The system predicts that Alice would want to start a new activity from her email. |
| Phone call from Fred | Update 000001 | The call is classified as part of activity 000001 probably because no other activity exists with Fred and the call is likely to be related. |
| Email from Fred "Should we start planning a company retreat?" | Create 000002 | This new email is unrelated to activity 000001 and a new one is started. |
| Phone call to Fred | Update 000001 | Since there are two activities ongoing with Fred the system could assign this call to any of them or even creating a new one. |
| Calendar event received "Company retreat, provisional date" | Update 000002 | This event is assigned to activity 000002 because it has the same topic as the existing events. |
| Email from Fred "Lease contract attached." Attachment: lease.pdf | Update 000001 | The email is associated with activity 000001. This email also possibly completes the activity by reaching the end of the conversational pattern as explained in "Intentions Lifecycle". |

(56) References Cited

U.S. PATENT DOCUMENTS

| | | | |
|---|---|---|---|
| 8,381,088 B2* | 2/2013 | Kikin-Gil | G06Q 10/109 |
| | | | 707/951 |
| 10,361,981 B2* | 7/2019 | Bennett | H04L 51/04 |
| 2014/0214404 A1* | 7/2014 | Kalia | G06F 40/40 |
| | | | 704/9 |
| 2015/0005009 A1* | 1/2015 | Tomkins | G06Q 10/063114 |
| | | | 455/456.3 |
| 2017/0161624 A1 | 6/2017 | Porter et al. | |

OTHER PUBLICATIONS

Liu, Chunxi, Puyang Xu, and Ruhi Sarikaya. "Deep contextual language understanding in spoken dialogue systems." Sixteenth annual conference of the international speech communication association. 2015. (Year: 2015).*

Blei, David M. et al., "Latent Dirichlet allocation," Journal of Machine Learning Research 3: (Jan. 2003) 993-1022. doi:10.1162/jmlr.2003.3.4-5.993.

Chang, Angel X. et al., "SUTIME: A Library for Recognizing and Normalizing Time Expressions," (2012) 8th International Conference on Language Resources and Evaluation (LREC 2012).

Guidelines for Temporal Expression Annotation for English for TempEval (Aug. 14, 2009). TimeML Working Group.

* cited by examiner

| Alice's trigger events timeline | Activity | Notes |
|---|---|---|
| Email to Fred "Can you send me the lease draft by Tomorrow?" | Create 000001 | The system predicts that Alice would want to start a new activity from her email. |
| Phone call from Fred | Update 000001 | The call is classified as part of activity 000001 probably because no other activity exists with Fred and the call is likely to be related. |
| Email from Fred "Should we start planning a company retreat?" | Create 000002 | This new email is unrelated to activity 000001 and a new one is started. |
| Phone call to Fred | Update 000001 | Since there are two activities ongoing with Fred the system could assign this call to any of them or even creating a new one. |
| Calendar event received "Company retreat, provisional date" | Update 000002 | This event is assigned to activity 000002 because it has the same topic as the existing events. |
| Email from Fred "Lease contract attached." Attachment: lease.pdf | Update 000001 | The email is associated with activity 000001. This email also possibly completes the activity by reaching the end of the conversational pattern as explained in "Intentions Lifecycle". |

FIG. 2

| Sam's Trigger Events | Intentions | Expectations | Tasks | Notes |
|---|---|---|---|---|
| Email to Tom: "Are you interested in knowing more?" | Create I001: Reached out to Tom, wait for him to reach back. | Create E001: Expect Tom to reach back in two days. | -- | The system establishes two days as expected lapse time. |
| E001 is not met within two days. | Close I001: unmet. Create I002: follow up with Tom. | Close E001: unmet. | Create T002: send Tom a follow up email. | I001 and E001 are unmet and closed. |
| Email from Tom: "Sure let's meet up." | Discard I002: unecessary. Create I003: follow up with Tom. | -- | Discard T002: unnecessary. Create T003: follow up with Tom. | I002 and T002 discarded as no longer required. The system should increase reach back time. |

FIG. 3

METHOD AND SYSTEM FOR SEMI-SUPERVISED SEMANTIC TASK MANAGEMENT FROM SEMI-STRUCTURED HETEROGENEOUS DATA STREAMS

The present patent application claims priority from U.S. Provisional Patent Application No. 62/379,521 filed Aug. 25, 2016, which is hereby incorporated by reference.

TECHNICAL FIELD OF THE INVENTION

Background of the Invention

Network-connected computing devices are commonly used to store and share information quickly and reliably. A user typically receives information from a variety of heterogenous data streams. For example, heterogeneous data streams from which a user may receive information can include email applications, text messaging applications, chat applications, calendaring applications, task managers, to-do lists, project management applications, time trackers, daily planners, and the like. Because the amount of information and the number of data streams are increasing, manually keeping track of activities, tasks, intentions, expectations, actions, and triggering events found in the heterogenous data streams is an arduous task for most users. What is needed is way to automatically create and update tasks by reading signals from external data sources and understanding what users are doing and automatically completing tasks by reading signals from external sources and understanding when an existing task has been executed.

SUMMARY OF THE INVENTION

Embodiments of the present invention are directed to a computer-implemented machine-learning method and system for automatically creating and updating tasks by reading signals from external data sources and understanding what users are doing. Embodiments of the present invention are directed to a computer-implemented machine-learning method and system for automatically completing tasks by reading signals from external sources and understanding when an existing task has been executed. Tasks created are representable and explainable in a human readable format that can be shown to users and used to automatically fill productivity applications including but not limited to task managers, to-do lists, project management, time trackers, and daily planners. Tasks created are representable in a way that can be interpreted by a machine such as a computer system or an artificial intelligence so that external systems can be delegated or connected to the system.

Delegated systems can use automatically generated tasks to better understand their users and enhance their user experience. Delegated systems can use automatically generated tasks to automate some of their features. Delegated systems can suggest actions or executions to complete tasks and ultimately complete the tasks.

Some embodiments of the present invention are directed to a computer-implemented machine-learning method and system for understanding how users perform sequences of tasks to complete long term activities.

Some embodiments of the present invention are directed to a computer-implemented machine-learning method and system for understanding when a new activity is started by reading signals from external data sources.

Some embodiments of the present invention are directed to a computer-implemented machine-learning method and system for understanding when a new activity has been completed by reading signals from external data sources Some embodiments of the present invention are directed to a computer-implemented machine-learning method and system for using the understanding how users perform sequences of tasks to complete long term activities to predict which tasks should be created for the user in order to help the user to complete ongoing activities.

Delegated systems can contribute to by suggesting executions as that optimize external objectives.

Tasks are projections of an abstraction called an intention. Intentions capture both that a user has a task as well as that symmetrically another user is passively expecting that task to be completed. The passive side of an intention is an expectation. At least one embodiment of the present invention can use expectations to understand what users expect and can react when such expectations are and are not met. At least one embodiment of the present invention can understand when expectations are no longer needed and can use the understanding of when expectations are no longer needed to complete tasks for other users.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 2 shows a table illustrating an example of demultiplexing trigger events and deciding whether they contribute to an existing activity;

FIG. 3 shows an example of intentions being created and completed;

DETAILED DESCRIPTION OF EMBODIMENTS

Embodiments of the present invention are directed to a computer-implemented machine-learning method and system to understand, explain, learn, and predict the semantics of users' working habits so that other machines can be delegated to handle that knowledge for the purpose of visualising it, augmenting it or systematically completing repetitive operations and so that predicted habits can be shown to users allowing them to semi-supervise the execution if they wish to. Given input streams of semi-structured events received from user selected data sources such as emails, calendar, cloud filesystems, web services, and smart devices, a computer system programmed in accordance with embodiments of present invention automatically infers the semantics of what users are trying to accomplish and represents it in a format that captures long term goals as well as the sequence of interactions which will lead to its completion.

Figure 1:
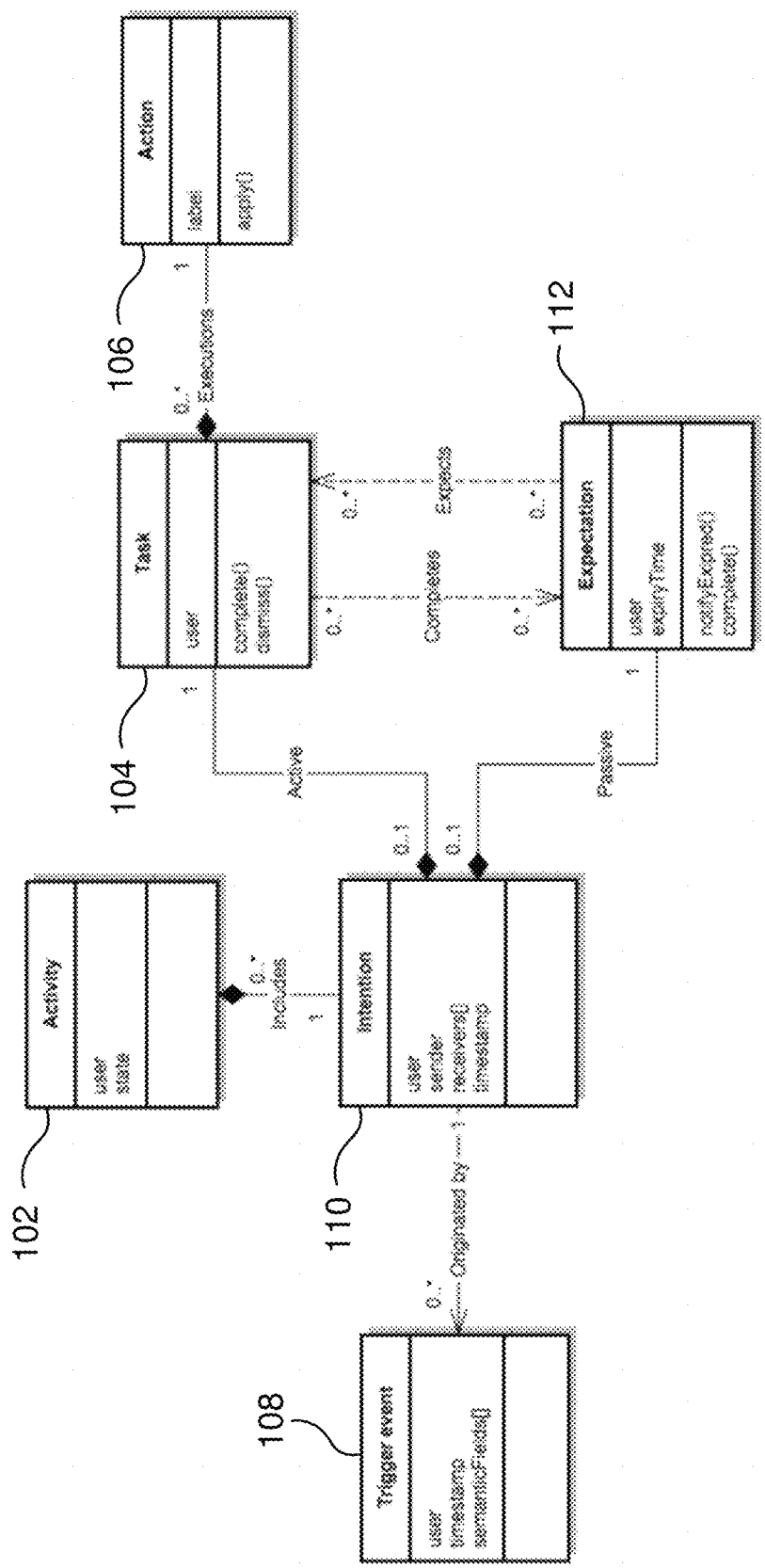
FIG. 1 shows the dependencies between the entities defined herein.

FIG. 1 shows the dependencies between the computer-implemented entities defined as follows:

Trigger event 108 is a heterogeneous message representation used to import signals from third party systems so that the signals can be processed for the purpose of inferring intentions.

Activity 102 is the representation of a long-term goal achievable with sequence of interactions between the users involved. For example, activity 102 can comprise a salesman trying to sign a contract with a new lead.

Intention 110 is the abstract understanding observed, inferred, or predicted that the user aims toward the completion of a certain goal to which he can either actively contribute or for which he will have to wait for external contributions. Intentions 110 are inferred from trigger events 108.

Task 104 represents an intention 110 that a user can proactively accomplish (i.e., where the user is the one who can complete the intention 110).

Expectation 112 represents an intention 110 that a user is expecting other parties to complete (i.e., when the user is waiting for the other party to complete the task 104 associated with the same intention 110. An unmet expectation 112 will generate a trigger event 108.

Action 106 is a suggested way of executing and completing a particular task 104. Executed actions 106 on connected data sources may generate a trigger event 108.

As users naturally progress on the execution of ongoing activities 102, tasks 104 and expectations 112 may need to be created updated, discarded or completed. By means of a subsystem named Gluru's Intention Lifecycle Engine (GILE), embodiments of the present invention allow both unsupervised and semi-supervised task management.

The semantic generation of intentions 110 is based on an extension of Gluru's Intention Inference Engine (GIIE) described in U.S. Patent Application Publication No. 2017/0131324 to Porter et al. ("Porter"), which is herein incorporated by reference in its entirety. In Porter, intentions 110 are represented as a list of contextual queries which would be used to search the information space. In embodiments of the present invention, intentions 110 are extended with semantics so that intentions 110 not only capture the context in which the user is operating but also capture the meaning of what the user is trying to accomplish.

Task Management from Semi-Structured Data Streams

Data sources send information in a stream of semi-structured events composed by metadata, structured data, and natural language data. Metadata contains annotations added by third party systems while the message was processed. Examples of metadata include timestamps and geo-locations for photos and routing addresses for emails. Structured data includes structured predefined fields which users have manually filled such as the location of a meeting or a video call link. Unstructured data contains natural text sentences manually written by users in the attempt of communicating. Examples of unstructured data are the bodies of emails, calendar agendas, SMS messages, and chat messages. Embodiments of the present invention process such events into a source-agnostic message that is called a trigger event 108. Processing semi-structured events into a source-agnostic trigger event 108 is necessary so that the system can seamlessly process data from different sources. Trigger event 108 is a typed and time stamped set of semantic fields which may include a sender, a list of recipients, a title, a natural text body, a location, a time with duration, and attachments. Embodiments of the present invention process third party sources by means of adapters from an arbitrary format to a trigger event 108 format which means converting from a semi-structured message to a list of semantically annotated fields. Not every trigger event 108 yields to an activity 102 or to intentions 110. Trigger events 108 are directional and the user is either the sender or the receiver Third party data streams often group data in threads that represent conversations, topics or projects. Examples of that are email threads, updates to the same calendar event or sessions for a chat message. Embodiments of the present invention represent the grouping abstraction by grouping sequences of trigger events 108 in conversations and by grouping intentions 110 generated from the same conversation as part of the same activity 102. Embodiments of the present invention need to understand when a new conversation is starting or if a received trigger event 108 is part of an existing activity 102. Activity 102 generation is described in the "Activity Management" section below.

Activities 102 progress in real life following conversational patterns (i.e., the sequence of interactions that users have from the beginning until the completion of the activity 102). Embodiments of the present invention learn conversational patterns as a temporal and causal sequence of intentions 110. The extraction of conversational patterns will be described in the "Intentions Lifecycle" section below.

Trigger events 108 are processed to extract intentions 110. Intentions 110 are extracted by combining metadata with structured data and natural text. Natural text is processed by analyzing sentence by sentence with respect to the context of the whole trigger event 108. Multiple sentences can contribute to the same intention 110. How intentions 110 are generated from sentences will be described in the "Extracting Semantic Intentions from Natural Text" section below. How embodiments of the present invention generate intentions 110 from structured data will be explained in the "Extracting Semantic Intentions from Structured Data" section below.

Given $T_{u,n}$ (the list of existing tasks 104 for a certain user u after the n-th trigger event 108) and given $I_{n+1}$ (the list of intentions 110 generated from the $(n+1)^{th}$ trigger event), embodiments of the present invention compute $T_{u,n+1}$ (the updated list of tasks for user u). Tasks 104 existing in $T_{u,n}$ may have been updated, completed, or discarded; and new tasks 104 may also have been created. The predictive algorithm to create and update tasks 104 from intentions 110 and conversational patterns is called the "Intention Lifecycle". The Intention Lifecycle will be described in the "Intention lifecycle" section below.

Activity Management

Embodiments of the present invention receive a stream of trigger events 108 coming from heterogeneous user-selected sources. In that stream, data points from various ongoing activities 102 are multiplexed into a single time series. Trigger events 108 from various sources can contribute to the same activity 102. Certain data points, such as spam or irrelevant conversations, are not relevant to users and need to be filtered out.

Embodiments of the present invention leverages machine-learning classification models to decide whether a trigger event 108 is part of an existing activity and, if the trigger event 108 is not part of an existing activity 102, to decide whether a new activity 102 should be created. Demultiplexing trigger events 108 and deciding whether they contribute to an existing activity 102 is a non-trivial task that can be achieved in different ways.

FIG. 2 shows a table illustrating an example of demultiplexing trigger events 108 and deciding whether they contribute to an existing activity 102. Alice sends an email to Fred asking, "Can you send me the lease draft by tomorrow?" The system detects a trigger event 108 from a source (email) selected by Alice. The system predicts that Alice would want to start a new activity 102 from her email. The system creates activity 00001. Next, Alice receives a phone call from Fred. The call is classified as part of activity 000001 probably because no other activity exists with Fred and the call is likely to be related. Activity 000001 is updated. Next, Alice receives an email from Fred asking, "Should we start planning the company retreat?" The system determines this new email is unrelated to activity 000001. A new activity 000002 is created. Next, Alice places a phone call to Fred. Since there are two activities (000001 and 000002) ongoing with Fred, the system could assign this call to either activity or create a new activity. Next, Alice receives a calendar event entitled, "Company retreat, provisional date." This trigger event is assigned to activity 000002 because the trigger event has the same topic as the existing events. Next, Alice receives an email from Fred that states, "Lease contract attached" and has an attachment entitled, "lease.pdf". The email is associated with activity 000001. This email also possibly completes the activity by reaching the end of the conversational pattern as explained in "Intentions Lifecycle" below."

It is possible to train a machine-learning classifier (e.g., a recurrent neural network or other sequence learner) that, given an activity 102 and a trigger event 108, the classifier will return the likelihood that the trigger event 108 is related to the given activity 102, allowing the system to decide which activity 102, if any, with which to associate the trigger event 108. Should the probabilities fail to reach a certain threshold, the trigger event 108 will instead be regarded as not belonging to any of the activities 102. The threshold could be set to minimize the probability of the user manually having to alter the assignment of trigger events 108 to an activity 102.

Using a classifier, although quite accurate, requires training data coming from known sources and may not perform well when new sources are connected. This training problem can be avoided with unsupervised solutions by clustering trigger events 108 already associated with ongoing activities 102 and by computing the geometrical distance between the trigger event 108 being processed and the resulting clusters. Such an algorithm in described, for example, in Porter as the "Spaces 112" algorithm. The Gluru Spaces algorithm identifies projects and automatically selects and adds resources to the identified projects by using an intention inference engine to identify the underlying intention and intelligent ranking engine to select resources over time. Users intentions are inferred by the intention inference engine. After recurring or predominant intentions are identified or selected by users, Gluru Spaces will use the intelligent ranking engine to filter resources relevant to that intention and will create a view to present them to the user. Over time, as existing resources change or new resources are added, Gluru Spaces will adapt the view accordingly. The more a user interacts with such a view, by manually adding or removing files, the more Gluru Spaces will record such actions and fine tune the intention of the view and therefore the criteria with which resources are selected. The section "Topic modelling" below describes how natural text can be clustered in topics that can then be used as a feature for this unsupervised solution.

When encountering trigger events 108 that are not part of an existing activity 102, the system has to decide whether they should be discarded as irrelevant or whether to start a new activity 102. This problem can also be solved with a classifier or with the Gluru Spaces algorithm using examples of discarded content as clusters. A classifier for this task could be implemented as follows. The classifier would be trained to predict whether the user will somehow respond to the trigger event 108 (e.g., reply to an incoming email or assign the event to activity or return a phone call, based on features of the trigger event 108 itself). The algorithm used for the classifier could be any suitable classification algorithm (e.g. a feed forward neural network, support vector machines (SVM's), etc.).

Intention Lifecycle

Given a trigger event n for a conversation c, a list of inferred intentions $I_n$ and the list of existing tasks $T_{u,n}$, the Intention Lifecycle is defined as the algorithm that applies conversational patterns to predict how the conversation will evolve following $I_n$ and how to update $T_{u,n}$ in $T_{u,n+1}$. Possible updates in converting $T_{u,n}$ in $T_{u,n+1}$ include: creating new tasks, updating existing tasks, completing existing tasks, and/or discarding existing tasks.

FIG. 3 shows an example of intentions 110 being created and completed. For example, consider an instance where a salesman, Sam, is using an embodiment of the present invention (for example, the Gluru app) and attempting to reach out to Tom, a possible lead, who is also using an embodiment of the present invention (for example, the Gluru app). Sam sends Tom an initial reach-out email, followed by a certain number of follow up messages, until either Tom replies to Sam or Tom becomes a cold lead. First, Sam sends Tom an initial email. Since both Sam and Tom use the Gluru app, the system processes the message for both Sam and Tom and creates a new activity 102 for both Sam and Tom. By processing the initial email, the system infers Sam's intention to reach out and creates intention I001. For Tom, the system could generate a task describing the action of reaching back to Sam's email, but since normally Tom doesn't reach back, the intention is ignored and the activity is completed on Tom's side. For Sam, the system creates expectation E001 to receive a reach back from Tom within two days. Assume that Tom was instead interested, and further assume that Tom did reach back to Sam even though Gluru predicted otherwise. Upon receiving Tom's reach back, the system will predict that, according to the conversational pattern, Sam's expectation E001 is met and can be completed. Also, the system will generate for Sam the task T002 to reach back to Tom and, for Tom, the task to follow up with Sam if Sam doesn't reach back to Tom. Assume instead that Tom is ignoring the message. After the expectation expires (Close E001: unmet), the system processes the expiration of the expectation as a trigger event (E001 not met within two days) and uses it to generate the intention to follow up (Create I002: follow up with Tom) and therefore a task for Sam to follow up with Tom (Discard T002: unnecessary; Create T003: follow up with Tom).

Figure 4:
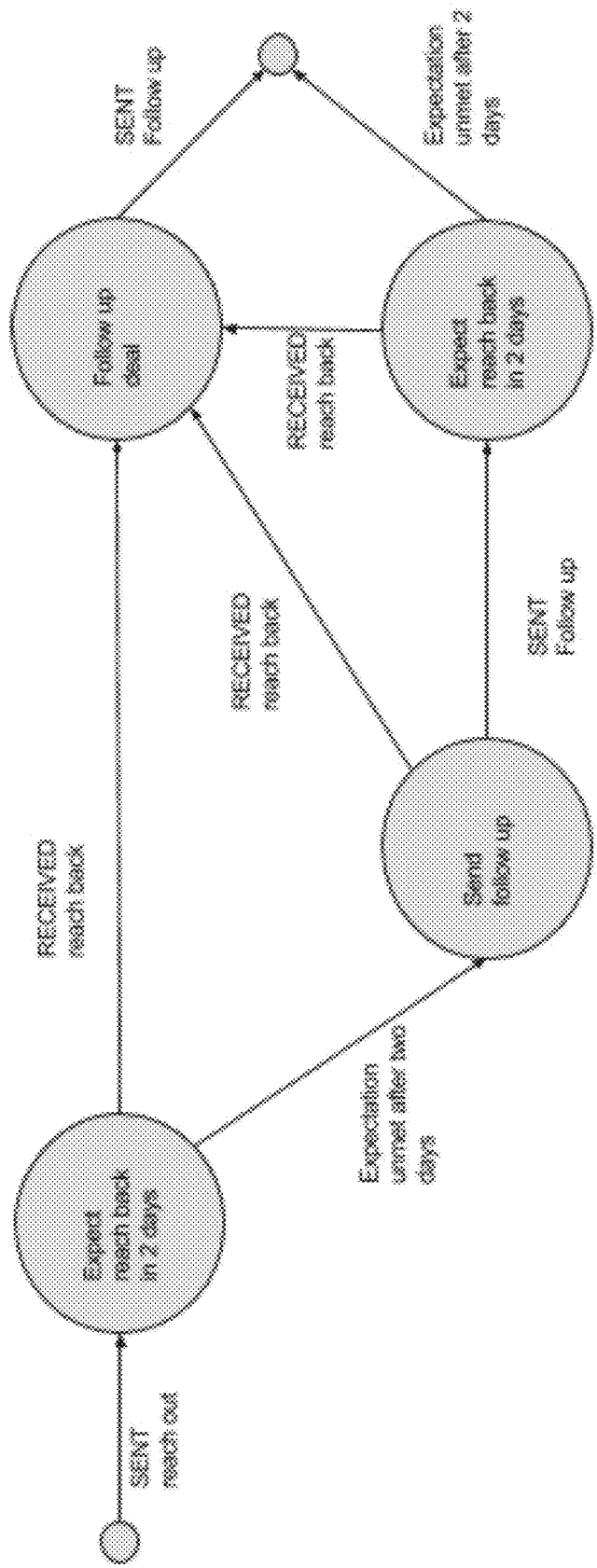
FIG. 4 shows a diagram representing the Markov chain for an exemplary conversational pattern.

The above example describes how the same conversation is processed in different ways depending on whether the user is the sender or the receiver and depending on the conversational patterns that the system has learned. The system has been trained to recognize and predict conversational patterns. Conversational patterns can be represented as Markov chains in which intentions are used to process transitions. FIG. 4 shows a diagram representing the Markov chain for Sam's conversational pattern. The system automatically learns and apply such conversational patterns.

When the list of intentions $I_n$ is processed, the system predicts which conversational pattern to apply and consequently updates the list of existing tasks 104. The mapping between tasks 104, their meaning, and trigger events 108 is possible because intentions 110 are semantically represented with an ontology, and therefore the system is capable of decoupling the meaning of a task 104 from various possible executions. In the example above, Tom could reach back by calling Sam instead of emailing him. The system will still classify the call as a reach back and it will still be able to progress in the conversation.

External prediction sources can be delegated to suggest how to complete tasks. These sources can generate predictions without disclosing private information with the system. For example, the external prediction source can comprise a cloud computing service.

Similarly, if the conversational pattern has a fork for the same intention 110, the system can adopt different algorithms to decide which source to select. Various algorithms could try to facilitate the accomplishment of different goals, such as cost minimization or revenue maximization.

A possible implementation of a subsystem capable of learning such conversational patterns could be achieved by, but not only by, a Recurrent Neural Network (RNN) trained to predict the next intention 110 in the conversation based on the intentions 110 currently existing. At its simplest, the RNN could be trained to predict whether the conversation is likely to continue (or not) given the intentions 110 so far. This could be extended to predict what the next event will be (e.g. whether a file will be shared or whether meeting will be arranged). If these predictions are done on a probabilistic basis, it will facilitate ranking of the conversations to determine which conversations to highlight to the user.

For example, if used by a salesperson, the implementing RNN, on the arrival of a prospective customer's response to an initial "reach out" email, might predict that the next step in the conversation would be to arrange a meeting with the customer to discuss the customer's interest in the products/services on offer. Operating in this manner, the RNN could, for example, facilitate reminding users to follow up on leads when anticipated responses do not appear or indicate that leads might be about to go cold and suggest corrective action. Recurrent networks such as RNN and long short-term memory (LSTM) are particularly indicated for this type of prediction because RNN and LSTM are able to predict events from time series. Time series are described further in the "Time Series Analysis" section below.

Furthermore, because tasks 104 are semantically annotated from the intention 110 that generated them, the system can delegate augmentation of each task tin T with information that will help the user to better understand or complete the task. This represents the suggested end execution of t. Augmentation is delegated to external systems that are aware of semantic classification of tasks 104 and are providing information relevant to execution of a task 104 given task type and contextual information provided by described system.

In a collaborative environment where multiple users share tasks 104, the system is supercharged with information enhancing its predictive capabilities and increasing users' productivity. Every intention 110 is symmetrically predicted for each user involved. When a task 104 is completed, the symmetric expectation can be immediately satisfied even before receiving the subsequent trigger event 108. More importantly, if the expectation 112 is discarded, the task 104 can also be dismissed and, if the task 104 is discarded, the expectation 112 can immediately be updated as unmet.

Extracting Semantic Intentions from Natural Text

Semantic intentions 110 extracted from the natural text contained in the trigger events 108 are uniquely capable of providing information about the progress of their activity 102 as well as generating additional related tasks 104. In this section, an exemplary classification mechanism is described, although other forms of classification can lead to similar results and are within the scope of embodiments of the present invention.

The received text is split into sentences using a stock sentence processor. Each sentence is then classified with an ontological forest (i.e., an ontology with multiple roots or multiple orthogonal ontologies depending on the domain). Classification relies on the artificial neural network (ANN) that is able to distinguish between sentences providing information and sentences outlining a particular call to action, commitment, and other supported intention types. The central concept in the ANN design is the ability to represent large dictionaries of a natural language in a smaller space called a "word embedding layer". The word embedding layer groups similar words in a n-dimensional space and allows the system to find context patterns defining particular classes of sentences such as previously described intention types.

In at least one embodiment of the present invention, the sentence representation used for the neural network is a matrix of size V*N, where V (width) is the vocabulary size for given task, and N (height) is the number of words in the sentence. A word embedding layer transforms the sentence to a E*N sized matrix where the width E is embedding the layer size, which is fixed during the training step to a particular value. The convolutional layer combined with a maximum pooling layer follows the word embedding layer. The purpose and intuition behind the convolutional layer is that a particular consecutive word combination (n-gram in traditional language processing) contains the essence of particular sentence classes (like intentions types). Application of filters (small sub-matrices of size that are smaller than the size of sentence matrix) that collapse comparatively large sentence-embedding matrix to more compact dimension allows ANN to figure out a set of abstract features that forms the next dense layer.

A dense layer is a vector of collapsed features that is represented in a linear form. It is used by ANN to transform linear abstract sentence representation into a target class that belongs to a particular classification tree described in semantic intentions ontology in the corresponding section.

Figure 5:
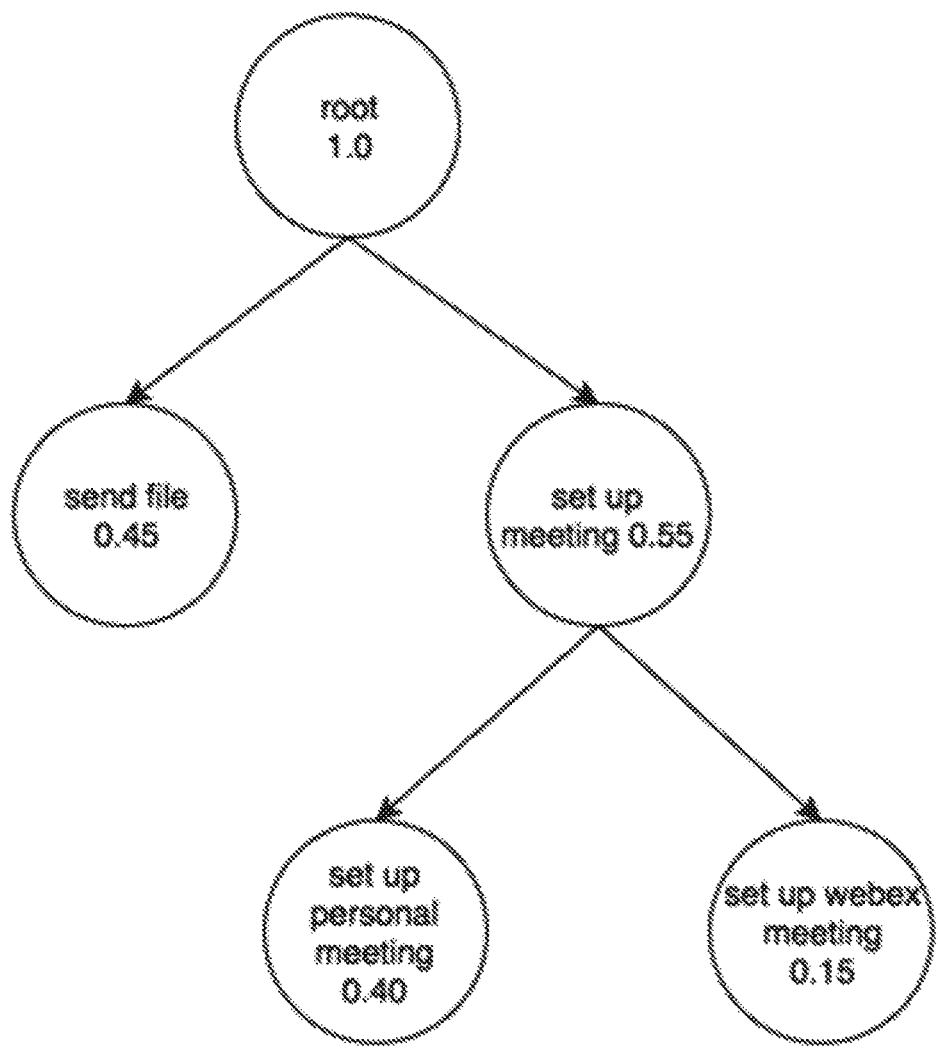
FIG. 5 shows the output of the last layer of network, class-by-class, where the probabilities of every consecutive layer is dependent on the probability of the parent class.

FIG. 5 illustrates the output of the last layer of network, class-by-class, where the probabilities of every consecutive layer is dependent on the probability of the parent class, although each level probabilities can be normalized to sum up to 1.0.

Sentences are also annotated with additional features that can be extracted from the text itself. An example of annotating sentences with additional features is the time extraction as described in the "Time Detection" section below.

The system processes sentences to extract intentions by simultaneously classifying sentences into a set of classes from a classification forest. Classification forest implies a set of independent tree-shaped classifications for a single object, which has N dimensions for classification, and each slot can have a value from a particular tree (for example, an email can be requesting, promising, or acknowledging the addressee to send a file, share information, or indicate calendar availability via email, phone, or in person).

Sentences that are not classified as containing an intention are discarded. Sentences that do contain an intention are added to the intention list I and passed to the intention lifecycle algorithm.

Ontologies are used to decouple the understanding and classification of what has happened (i.e., the trigger events) from the prediction of what the user should do next (i.e., actions that would complete a task) by creating intentions and predicting tasks representing the semantic meaning of what users should do instead of the action itself. It follows that tasks and expectations can be completed when intentions matching the semantic of their completion is observed.

Traditional predictive engines learn what users do and suggest what to do next. Learning what users do and suggest what to do next is referred to herein as "repeat behavior." The problem with repeat behavior is that once the system has learned to predict B from A, the system always predicts B after A. Modern techniques use deep neural networks such as recurrent neural networks (RNN) or long short-term memory networks (LSTM) that can learn more complicated patterns including trends over time and time series. These complicated patterns are still a form of repeat behavior in which given more data the system can make more sophisticated and stateful predictions.

Instead, embodiments of the present invention understand the meaning of what users intend to do so that the prediction of what the user will do next can be delegated to competing prediction sources. With this approach, the system is agnostic to available data sources; adding, removing or changing data sources does not require the model to be retrained. Also, predictions can be easily motivated to users by describing the semantic intention for which tasks have been created.

Consider an implementation classifying intentions using three different semantic ontologies. The first dimension could capture the semantics of actions embedded in the text. For example, a sentence "Could you please share status on that contract?" implies sharing information, whereas "Could you advise me who is the best person to communicate with to deal with that contract?", besides implying sharing of information, also presumes a contact detail to be sent. Action ontology provides the semantics of a task in execution-agnostic way so that the external system can decide the best way to accomplish a task based on its type and other information.

A second dimension could the speech act classification. Tasks 104 can be inferred for both parties involved in the conversation. In the example with Tom and Sam, one system created a follow up task, and the other system created a reach back task. In other cases, a task 104 can be the same for both parties with the only difference in the direction of that task. For example, a sentence "Please, send me a file" generates a "share file" task, but for the sender it is an expectation to have a file sent, whereas for receiver it is a request to share a file. Speech act classification detects the general sense of an intention and could be used to help the system in predicting whether a task or an expectation (or neither) need to be created.

A third dimension could help identifying the desired communication channel, if any. For example, "Follow this link to comment" implies a communication via web browser while "Could you shared that presentation with me?" does not indicate any preferable means of sharing the information. Delegated systems could use this dimension to better suggest actions.

The system can be extended with any number of ontologies. The system can also be specialized with domain specific ontologies to better capture the semantic of intentions coming from specific verticals.

Extracting Semantic Intentions from Structured Data

Structured data fields also contain information that can yield an intention 110. This depends on the nature of the field itself within the context of the whole trigger event 108. For instance, an email asking to sign a contract and with a portable document format (PDF) document attached could yield the intention 110 to "sign the contract."

In the previous section, it was described how the system applies various layers of convolutions to natural text fields, and how then the system applies the resulting convolution to a network capable of classifying them within the ontology by learning the expected behavior out of given examples. The process of extracting intentions out of structured data is similar with the difference that instead of applying layers of convolution, features are programmatically extracted from each field depending on their semantic type.

Time Detection

Predicting time is a crucial part of the system as it allows the scheduling of intentions 110 over time. In particular, when scheduled intentions 110 are expectations 112, being able to schedule expectations 112 over time allows the system to react when expectations 112 are not met.

Incoming trigger events 108 have a timestamp that defines a moment when the input was received by the system. A timestamp can be used to predict whether a pattern over time exists. Structured data also contains time in fields that can be semantically annotated as time or durations. In addition, the system extracts additional temporal information from natural text.

Temporal extraction can be done by stock components analogous to TIMEX3 format (Guideline 2010) and SUTime (Chang 2012) formats for date/time mention extraction to extract following types of temporal objects:

1. Time—a time point indicating a particular instance on a time scale with a variable level of precision (e.g., millennium, century, decade, year, month etc.).

2. Duration—the amount of time between two end points of a time interval. Duration may be definite or indefinite (both amount and unit can be either known (two years) or not defined (few years, from 5 to 6 hours).

3. Interval—a range in time defined by starting and ending time points.

4. Set—a set of usually recurring temporals (e.g. every Wednesday).

Topic Modeling

A topical model is a statistical model for discovering the abstract topics that occur in a collection of documents or in a particular document. Topical models, such as Latent Dirichlet allocation (Blei, 2003), figure out distribution of words across topics for a document collection, and, then, assign every document with a distribution of topics based on words that document contains. Topic modelling routines are able to infer both controlled and uncontrolled number of topics, each of which may be labeled or be "hidden" from inference initiator. Topical models for embodiments of the present invention are inferred from different sources depending on the source size, which include, but are not limited to: global document collections representing most general topics present in text documents produced by humanity; particular document collections suitable for distinguishing topics in a definite domain of knowledge (e.g. law documents, documents concerning biological research, economic reports); document collections providing source for modelling topic distribution across a certain group of related people (company, governing body, group of acquaintances etc.); and personal document collections suitable for modelling topical model in one person's history of conversation.

Topics are used to detect important trigger events and important sentences which can contain a task that is probable to be of interest for user. Different topical models for different levels of granularity of data allow use global data to detect common patterns (for example, emails talking about a general meeting) while retaining privacy and ability to detect important topics on company level (e.g. a conversation about an important partner) or on personal level (by detecting topics relevant to projects user is working on).

Time Series Analysis

Events in a user's timeline occur consecutively. and the order of events influences the actions 106 user intends to take or will take. The system observes patterns present both on global level and on a per-subset level (where subset may range from one person to a group of persons belonging to a formal body (e.g. company) or informal body (e.g. professionals working in particular industry). Observed patterns include (but are not limited to) following entities: general activity timeline from current time point to a certain point in the future; observable patterns in activity (e.g. re-occurring consecutive events like a follow-up email sent after a phone call); and historical, global and local, timeline suitable for referencing current time series to patterns observable in a user's day-to-day activities.

Extracted features alongside with other features serve different purposes, one of which is powering up anomaly detection (spikes in daily activities amount which can be observed by comparing daily load with a history of similar days in the past). Another scenario is a user making a phone call and not writing a follow up despite the historical pattern of such action. The system understands that deviation and suggests a yet empty timeframe in the daily schedule to circulate a follow up on the call for every party involved.

Hardware Environment

Figure 6:
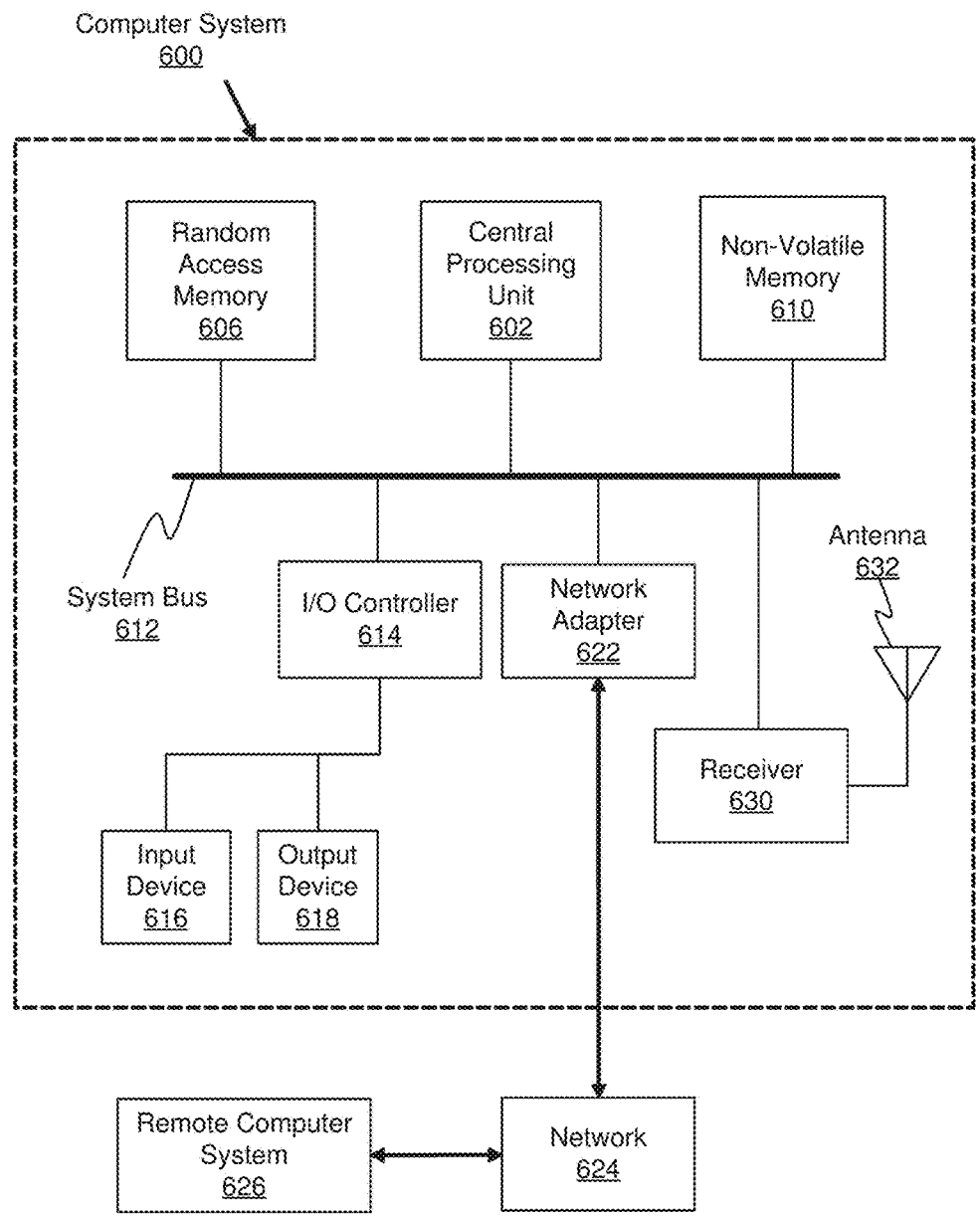
FIG. 6 shows a block diagram of a computer system suitable for storing and/or executing a computer program in accordance with embodiments of the present invention.

At least one embodiment of the present invention is directed to a computer program encoded in a computer-readable memory. The computer program comprises computer-executable instructions that, when executed, causes one or more computer systems to perform embodiments of the present invention described herein. The term "computer system" as used herein refers to any data processing system or computer system including, but not limited to, personal computers (PC), file servers, cloud computing systems, software-as-a-service (SaaS) systems, cellular telephones, smartphones, tablet devices, laptop computers, personal digital assistants, and the like. FIG. 6 is a block diagram showing a computer system 600 suitable for storing and/or executing a computer program in accordance with embodiments of the present invention. Computer system 600 includes a central processing unit 602 having at least one microprocessor. Central processing unit 602 can be coupled directly or indirectly to memory elements through system bus 612. The memory elements comprise computer-readable memory capable of storing computer-executable instructions. The memory elements can include random access memory 606 employed during the actual execution of the program code and non-volatile memory 610 for longer term storage of data and instructions. One or more input devices 616 and output devices 618 can be coupled to system bus 612 either directly or through an intervening I/O controller 614. Examples of input device 616 include, but are not limited to, a pointing device, such as a mouse or a trackpad, or a keyboard. Examples of output device 618 include, but are not limited to, a display screen or a printer. Input device 616 and output device 618 can be combined into a single device, for example, as a touchscreen comprising a display screen (for displaying output to the user of computer system 600) having a touch-sensitive surface (for receiving input from the user of computer system 600). One or more network adapters 622 may also be coupled to computer system 600 to enable the system to become communicatively coupled to remote computer system 626 or remote printers or storage devices through intervening private or public networks 624. Modems, cable modems, Ethernet cards, and wireless network adapters are just a few of the currently available types of network adapters. Computer system 600 can include one or more receivers 630. Receiver 630 receives wireless signals via antenna 632. Receiver 630 is adapted for receiving a data signal from a transmitting device. Receiver 630 can comprise a transceiver capable of both transmitting and receiving wireless data signals, including but not limited to, wireless local area networking, Wi-Fi, Bluetooth, cellular radio signals (GSM, CDMA, UMTS, LTE, etc.), global positioning system (GPS) signals, near field communication (NFC) signals, and the like. While various component devices of computer system 600 are shown as separate component devices in FIG. 6 for purposes of description, the various component devices may be integrated into a single device, as is known in the art, such as a system-on-a-chip (SoC) device.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A computer-implemented machine-learning method comprising:

detecting a trigger event from a user-selected source, in which the trigger event comprises a heterogeneous message representation used to import a signal from a third-party system so that the signal can be processed for a purpose of inferring intentions;

analyzing the trigger event to determine whether to associate the trigger event with one of several ongoing activities or with a newly created activity, each activity consisting of a goal achievable with a sequence of steps between users;

processing the trigger event using machine-learning to determine an intention by combining metadata associated with the trigger event with structured text of the trigger event and natural text of the trigger event, the intention directed to completion of a goal in the activity;

creating a task associated with the activity associated with the triggering event if the intention indicates a task that a user can complete; and
creating an expectation associated with the activity associated with the triggering event if the intention indicates a task that the user must wait for someone other than the user to complete,
wherein analyzing the trigger event to determine whether to associate the trigger event with one of several existing activities or with a newly created activity comprises clustering trigger events already associated with ongoing activities and computing the geometrical distance between the trigger event being processed and the resulting clusters.

2. The computer-implemented method of claim 1, further comprising:
detecting a second trigger event;
processing the second trigger event using machine-learning to determine that an action has been performed, in which an action is a suggested way of executing and completing the task;
marking the task complete if the action indicates that the task has been completed by the user; and
marking the expectation as complete if the action indicates that the task has been completed by someone other than the user.

3. The computer-implemented method of claim 1, further comprising:
in response to determining the trigger event is associated with an existing activity, updating the existing activity with the trigger event;
in response to determining the trigger event is not associated with an existing activity, using a machine-learning classifier to determine whether to create a new activity with the trigger event or disregard the trigger event as being irrelevant;
creating a new activity if the machine-learning classifier determines a new activity should be created in response to the trigger event; and
disregarding the trigger event as being irrelevant if the machine-learning classifier determines a new activity should not be created in response to the trigger event.

4. The method of claim 3, further comprising using machine-learning to determine a plurality of tasks required to complete the activity.

5. The computer-implemented method of claim 1, in which the created task is representable and explainable in a human readable format displayable to the user and used to automatically fill a productivity application.

6. The computer-implemented method of claim 5, in which the productivity application is selected from a group consisting of: task managers, to-do lists, project management, time trackers, and daily planners.

7. The computer-implemented method of claim 1, in which the created task created is representable in a way that can be interpreted by a delegated system comprising an external computer system or an external artificial intelligence.

8. The computer-implemented method of claim 7, in which the delegated system uses the task to automate one or more features of the delegated system.

9. The computer-implemented method of claim 7, in which the delegated system suggests an action to complete the created task or expectation.

10. The method of claim 1 further comprising creating a second task by predicting a subsequent event associated with the activity associated with the triggering event.

11. The method of claim 10 in which predicting a subsequent event associated with the activity associated with the triggering comprises predicting a subsequent event using a recurrent network.

12. A computer system comprising:
a processor;
a network adapter coupled to the processor for receiving signals from a third-party system and sending signals to the third-party system;
a computer-readable memory coupled to the processor, the computer-readable memory programmed with computer-executable instructions that, when executed by the processor, cause the computer system to perform the steps of:
detecting a trigger event from a user-selected source, in which the trigger event comprises a heterogeneous message representation used to import a signal from the third-party system so that the signal can be processed for a purpose of inferring intentions;
analyzing the trigger event to determine whether to associate the trigger event with one of several ongoing activities or with a newly created activity, an activity consisting of a goal achievable with a sequence of steps between users;
processing the trigger event using machine-learning to determine an intention by combining metadata associated with the trigger event with structured text of the trigger event and natural text of the trigger event, the intention directed to completion of a goal in the activity to which the user actively contributes;
creating a task associated with the activity associated with the triggering event if the intention indicates a task that a user can complete; and
creating an expectation associated with the activity associated with the triggering event if the intention indicates a task that the user must wait for someone other than the user to complete
in which the step of analyzing the trigger event to determine whether to associate the trigger event with one of several existing activities or with a newly created activity comprises clustering trigger events already associated with ongoing activities and computing the geometrical distance between the trigger event being processed and the resulting clusters.

13. The computer system of claim 12, further programmed to perform the steps of:
detecting a second trigger event;
processing the second trigger event using machine-learning to determine that an action has been performed, in which an action is a suggested way of executing and completing the task;
marking the task complete if the action indicates that the task has been completed by the user; and
marking the expectation as complete if the action indicates that the task has been completed by someone other than the user.

14. The computer system of claim 12, further programmed to perform the steps of:
in response to determining the trigger event is associated with an existing activity, updating the existing activity with the trigger event;
in response to determining the trigger event is not associated with an existing activity, using a machine-learning classifier to determine whether to create a new activity with the trigger event or disregard the trigger event as being irrelevant;

creating a new activity if the machine-learning classifier determines a new activity should be created in response to the trigger event; and disregarding the trigger event as being irrelevant if the machine-learning classifier determines a new activity should not be created in response to the trigger event.

15. The computer system of claim 14, further programmed to use machine-learning to determine a plurality of tasks required to complete the activity.

16. The computer system of claim 12, in which the created task is representable and explainable in a human readable format that displayable to the user and used to automatically fill a productivity application.

17. The computer system of claim 16, in which the productivity application is selected from a group consisting of: task managers, to-do lists, project management, time trackers, and daily planners.

18. The computer system of claim 12, in which the created task created is representable in a way interpretable by a delegated system comprising an external computer system or an external artificial intelligence.

19. The computer system of claim 18, in which the delegated system uses the task to automate one or more features of the delegated system.

20. The computer system of claim 18, in which the delegated system suggests an action to complete the created task or expectation.

* * * * *